Patented Feb. 22, 1944

2,342,209

UNITED STATES PATENT OFFICE 2,342,209

MOISTUREPROOFED REGENERATED CELLULOSE

James A. Mitchell, Kenmore, N. Y., assignor to E. I. du Pont de Nemours & Company, Wilmington, Del., a corporation of Delaware No Drawing. Application August 23, 1941, Serial No. 408,089

1 Claim. (Cl. 117—145)

This invention relates to moisture-resistant wrapping material, especially moistureproofed, transparent, non-fibrous sheet. More particularly it appertains to non-tacky, heat-sealable, age-resistant, light- and heat-stable, moistureproofing coatings on films of regenerated cellulose and the like.

One of the newer sheet wrapping materials consists of a thin, cellulosic base sheet having a moistureproofing coating. The manufacture of typical base sheet (film, foil, pellicle, skin, tissue, web) is described in U. S. A. Patents No. 1,548,864 (Brandenberger) and 2,123,883 (Ellsworth). Representative coating compositions, and the application thereof, are set out in U. S. A. Patents 1,737,187 (Charch and Prindle), 1,826,697-8 (Charch and Craigue), 2,042,589 (Charch and Hershberger), 2,147,180 (Ubben), 2,159,151 (Hershberger), 2,169,366 (Meigs) and 2,207,747 (Staudt).

The coating is usually a continuous, unbroken layer comprising essentially moistureproofing material (material which does not dissolve more than an infinitesimal amount of, if any, water), for example, a waxy (wax-like) substance such as paraffin wax, a cementing (binding, film-forming) material therefor, for example, cellulose nitrate. Generally the base film contains softening material, for example, glycerol, and the coating contains plasticizing material, for example, dibutyl phthalate, to promote flexibility. To overcome any haziness which might result from some proportions and combinations of other components of the coating, transparentizing (blending, homogenizing) material, for example, resins and gums such as damar and ester gum, is ordinarily included.

In spite of the many desirable properties of this kind of wrapping material, it has certain characteristics which limit its usefulness; for example, when products containing considerable water (cheese, fish, fresh vegetables, etc.) are wrapped therein, the surface coating loosens in a few hours, thereby reducing the effectiveness of the wrapping. Another difficulty is encountered in sealing material when it is employed as a wrapper. One of the commonest and simplest methods for sealing packages (so that the contents are completely enclosed) is by means of heat and pressure. Moistureproofed, transparent, regenerated cellulose film possesses to a certain degree the characteristic of being sealable by this method, but it does not possess this property to an extent which is completely satisfactory. Extensive research has been, and is being, carried out with the object in view of improving this type of material, particularly with respect to the characteristics just mentioned.

Rubber, a polymer-like material composed of units having the formula:

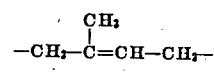

can be cyclized (or isomerized) in various ways to form a product having the same empirical formula, but which appears to have a structural unit derived from four of the original units corresponding to the formula:

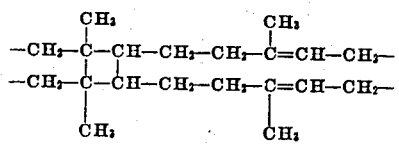

as indicated in J. I. E. C. (1941) XXXIII 389 et seq.

It has previously been proposed that rubber cyclized with tin compounds and the like be employed in moistureproofing coating compositions (U. S. A. patent application Serial No. 749,615, filed October 23, 1934, by Hershberger), but various reasons, including rapid weakening of adhesive bonds containing it, have retarded its use.

It was an object of this invention to provide improved coating compositions. Other objects were to produce improved moistureproofing coating compositions, improved moistureproofing coatings and improved moistureproof sheet wrapping material. Further objects were to produce improved moistureproofed, non-fibrous pellicles, to produce satisfactory coating compositions comprising cyclized rubber, to produce coating compositions which would adhere firmly to a flexible base sheet even when subjected to moisture and water for long periods of time, to produce coating compositions which will give adhesive bonds of great strength upon the application of heat and pressure, to produce coating compositions which will remain stable when exposed to high temperatures, light and the like, for long periods of time, and to produce a composition which will, upon the application of heat and pressure, give adhesive bonds of great strength for laminating thin, flexible, non-fibrous sheet material such as regenerated cellulose and the like. A general advance in the art, and other objects which will appear hereinafter are also contemplated.

Surprisingly, it has now been found that compositions prepared from mixtures of cyclized rubber and polymerized isobutylene, for example, moistureproofing coatings, have excellent heat sealability, give adhesive bonds which are initially very good and remain so for long periods of time, and are stable and transparent after long exposure to light, high temperatures, etc.

How the foregoing objects and related ends are accomplished will be apparent from the following exposition, in which are disclosed the principle and divers embodiments of the invention, including the best mode contemplated for carrying out the same. Parts are given by weight unless otherwise specified.

*Example I*

Coat a sheet of regenerated cellulose approximately 0.00088 of an inch thick with a moistureproofing coating composition in the usual manner, by passing it through a bath consisting of:

| | Parts |
|---|---|
| Pliolite[1] (milled; deformation point 30° C.) | 12.3 |
| Paraffin wax (M. P. 60° C.) | 1.2 |
| Polybutene (Vistanex #6 grade) | 1.5 |
| Toluene | 110.0 |

[1] Pliolite is a thermoplastic rubber derivative made by condensing (isomerizing, cyclizing) rubber with a catalyst of the tin tetrachloride type (see Paper Trade Journal, page 96, February 23, 1939, J. I. E. C. XIX 1033, XXVI 125, XXXIII 389, and U. S. A. Patents 1,797,188, 1,846,247, 1,853,334 and 2,052,391). The chemical structure is described in "Rubber Age," April 1939.

and removing the excess solution from the surface by means of doctor knives. Introduce the coated sheet into a drier through which air is circulating, and where after a rapid rise in temperature, the coating will dry at a temperature approximately equal to the melting point of the wax. The resulting product will be moistureproof, have a permeability value of 2 and a heat seal value of 900.

*Example II*

Coat a dry cast cellulose acetate film approximately .001 of an inch in thickness in the manner described in Example I, with a composition comprising essentially:

| | Parts |
|---|---|
| Pliolite (milled; deformation point 30° C.) | 11.7 |
| Paraffin wax (M. P. 60° C.) | 1.8 |
| Polybutene (M. W. approx. 8,000) (Visco resin) | 1.5 |
| Benzene | 110.0 |

After removal of the volatile solvent the coating will firmly adhere to the surface of the sheet, be moistureproof, have a permeability value of 5 and a heat seal value of 460.

*Example III*

Coat one side only of regenerated cellulose sheet 0.00088 of an inch in thickness, with a composition consisting of:

| | Parts |
|---|---|
| Pliolite (milled; deformation pt. 30° C.) | 15.62 |
| Paraffin wax (M. P. 60° C.) | 18.75 |
| Polybutene (Vistanex #6) | 28.12 |
| Toluene | 188.00 | in the manner described in Example I. After drying the coating, and while the product is still hot, press the coated side of the sheet against another sheet of regenerated cellulose to bond the two together. After cooling, the two sheets of regenerated cellulose will be firmly adhered together, and the resulting unitary product will be moistureproof. It will have a permeability value of 200 and be extremely resistant to the action of water and atmospheres of high humidity.

*Example IV*

Coat one side only of a thin cellulose acetate sheet with a composition consisting of:

| | Parts |
|---|---|
| Pliolite (milled; deformation point 30° C.) | 9.37 |
| Paraffin wax (M. P. 60° C.) | 25.00 |
| Polybutene (M. W. approx. 7,000) | 28.13 |
| Toluene | 188.00 | doctor the coated sheet, and remove the solvent by the method of Example I. While still hot, apply a sheet of paper to the coated surface and press the two sheet materials into firm engagement. The resulting laminated product will resist the deleterious action of water vapor for long periods of time, and the component laminae will remain firmly adhered together.

*Example V*

Coat both sides of a sheet of regenerated cellulose with a moistureproofing lacquer having the formulation:

| | Parts |
|---|---|
| Pliolite (milled; deformation point 30° C.) | 22.5 |
| Paraffin wax (M. P. 60° C.) | 3.0 |
| Polybutene (M. W. approx. 7,000) | 4.5 |
| Toluene | 220.0 | by the method described in Example I. The resulting product will be transparent, have a permeability value of 5 and a heat seal value of 800. The coating will be firmly adherent after exposure to water for a period of one day.

*Example VI*

Coat both sides of a sheet of regenerated cellulose with a solution of:

| | Parts |
|---|---|
| Pliolite (deformation point 65° C.) | 24 |
| Paraffin wax (M. P. 60° C.) | 3 |
| Polybutene (M. W. approx. 1,000) (Vistac) | 3 |
| Toluene | 220 | in the manner set out in Example I. The resulting product will show superior adhesion of the coating, moistureproofness, anchorage, and heat sealing.

*Example VII*

Coat both sides of a regenerated cellulose film in the manner described in Example I, with a solution consisting of:

| | Parts |
|---|---|
| Pliolite (milled; deformation point 55° C.) | 24.6 |
| Paraffin wax (M. P. 60° C.) | 3.0 |
| Polybutene (M. W. approx. 1,000) (Vistac) | 2.4 |
| Toluene | 220.0 |

The resulting coated film will exhibit considerably less degradation in moistureproofness, heat sealing, adhesion and anchorage when exposed to ultra-violet light or heated in an atmosphere containing oxygen than similar appearing film prepared in an identical manner but substituting a heavy hydrocarbon oil, such as mineral oil or petrolatum, for the polybutene. The final product will also differ in the same manner from material produced in the same manner but omitting the polybutene.

Example VIII

Coat a regenerated cellulose film with a moisture-proofing solution comprising:

| | Parts |
|---|---|
| Marbon B[1] (softening point 50° C.) | 24 |
| Paraffin wax (M. P. 60° C.) | 3 |
| Polybutene (M. W. approx. 1,000) (Vistac) | 3 |
| Toluene | 220 |

[1] A chlorine-free cyclized rubber corresponding in properties to Pliolite.

by the method of Example I. Coat bleached kraft paper with the same composition in the same manner.

Example IX

Coat one side only of a sheet of regenerated cellulose with a composition consisting of:

| | Parts |
|---|---|
| Marbon B (softening point 50° C.) | 40 |
| Polybutene (M. W. approx. 7,000) | 6 | in the manner described in Example IV. Bond a sheet of cellulose acetate to the resulting product by the application of heat and pressure. Bond a sheet of paper to the coated regenerated cellulose by the application of heat and pressure. Good adhesive bonds will result.

Example X

Coat both sides of a sheet of regenerated cellulose, using the procedure of Example I and a moistureproofing lacquer comprising essentially:

| | Parts |
|---|---|
| Pliolite (milled; deformation point 30° C.) | 25 |
| Paraffin wax (M. P. 60° C.) | 3 |
| Polybutene (M. W. approx. 200,000) | 1.5 |
| Xylene | 300.0 |

The resulting product will be highly transparent and exhibit a permeability value of 10 and a heat seal value of 500.

The isomerization of rubber reaction is very exothermic, and as a consequence it is very difficult to stop the reaction in time to get a product having a low deformation (softening point). The practical minimum is about 30° C. As the reaction progresses, the deformation point rises. A product having a deformation point of about 105° C. is obtained when the reaction is allowed to go to completion.

The polymers, both high (40,000–300,000) and low molecular weight, of iso-olefins, such as isobutylene, used in this invention, are well known materials (J. I. E. C. XXXII 299, 731). Several varieties are available commercially under proprietary names, for example, Vistac (approximately average molecular weight 500–1500), Visco resin (approximate average molecular weight 5,000–10,000) and Vistanex #6 (approximate average molecular weight 20,000–40,000), and other molecular weight material can easily be produced. Polymers having a molecular weight within the range 300 to 300,000 have been found useful. Products in the intermediate range of 500 to 100,000 are preferred. In general, the products are prepared by polymerizing isobutylene (or related olefin) at low temperatures with a catalyst such as boron trifluoride, phosphorous trifluoride, aluminum chloride and sulfuric acid. For specific details of the preparation reference is made to U. S. A. Patents Nos. 2,130,507 and 2,051,840.

As the moistureproofing agent, any wax (used generically to include waxy substances like paraffin wax, as well as true waxes which are monohydric alcohol esters of higher fatty acids) or mixture of waxes, may be employed. Ordinarily paraffin wax melting above 50° C., or better, that melting at 60° C. (and above), is preferred.

The compositions of this invention are intended primarily for coating transparent, smooth, substantially non-porous, non-fibrous, water-sensitive sheet which may be obtained by coagulation or precipitation and/or regeneration from aqueous (or aqueous alkaline, for example, alkali metal hydroxide and the like) dispersions (or solutions). The results obtained with regenerated cellulose (from viscose, cuprammonium, and like sources), polyvinyl alcohol and low (lowly) substituted (less than one mol per glucose unit) cellulose ethers (U. S. A. Patent No. 2,123,880 to Ellsworth), such as glycol cellulose, cellulose glycolic acid and alkyl (for example, methyl and ethyl) cellulose, are especially satisfactory. They may also be advantageously employed with organic solvent soluble products, such as cellulose ethers (for example, ethyl cellulose), cellulose esters (for example, cellulose acetate), polyvinyl acetals, and the like. Lowly esterified cellulose, albuminous material (gelatin, casein, etc.), paper, modified paper, and the like, may also be employed in connection with the new compositions. The new products may be used to coat fabrics, to prepare molding materials, to act as cementing (binding) agents in protective coatings for wood, metal, etc., as adhesives, and numerous other purposes.

The properties of the cyclized rubber-isobutylene polymer compositions may be enhanced and modified in known ways by the incorporation of minor proportions of other materials. Details of the conventional modifying practices such as dyeing, pigmenting, plasticizing (or softening), transparentizing, and like procedures and materials used therein, are well known and are disclosed in the patents listed elsewhere herein. Reference is made thereto for specific details. Beneficial results are frequently brought about by incorporating natural and/or synthetic resins.

Organic solvent soluble amino polymers (basic amino nitrogen-containing polymers) of the type disclosed in U. S. A. Patent No. 2,190,776 (Ellingboe and Salzberg) may be added to the composition for further or specialized protection. These materials are also soluble in 2% aqueous acetic acid. Anti-oxidants and other stabilizers may be added for the same purpose.

In preparing the coating compositions, any solvent dissolving the cyclized rubber and the polybutene (hydrocarbon) may be used, although hydrocarbon solvents, particularly aromatics such as benzene, toluene and xylene, are preferred. Mixed solvents such as those containing minor proportions of ketones, esters, or alcohols, may be used. These compositions may be applied as melts at high temperatures, in which case no solvent, or only a minor proportion of solvent, need be present.

Ordinary moistureproof sheet wrapping material consists of a regenerated cellulose film 0.00088 of an inch thick, with a moistureproofing coating 0.0005 of an inch thick on each side.

The amount of polybutene material in the new compositions is preferably within the range of 0.5% to 50.0% (based on the amount of cyclized rubber), but in special instances it may be desirable to use much more, for example, up to 200% or even more. One or more (mixtures of) polybutenes may be used.

Incorporation of wax in the new cyclized rubber-polybutene compositions leads to moisture resistance. Ordinarily 3% to 15% wax, based on the total solids (non-volatiles) is employed to secure moistureproofness in coating compositions. Noticeable improvement is obtainable with even smaller amounts.

The cyclized rubber may be prepared in any one of several different ways, and its composition and properties may vary somewhat, but however prepared, it is thermoplastic and less unsaturated than rubber. It appears to have an empirical formula $(C_5H_8)_x$ and to be a condensation derivative of rubber.

In the condensation, various reagents may be employed for converting rubber into the rubber derivative. In one mode of preparation, a solution (the reaction with the rubber is advantageously carried out in solution) of the rubber in benzene is boiled for an hour or two and then, while continuing the boiling under reflux condenser, up to 10% (based on the amount of rubber) of a conversion agent, such as stannic chloride, is added. The heating is then continued for perhaps several hours, until the desired reaction has taken place. The condensation derivative of the rubber is isolated by pouring the reaction mass into water, acetone, alcohol (methyl, ethyl, etc.) and the like.

Tin tetrachloride apparently reacts with the rubber to form a tin chloride addition product of rubber (or cyclized rubber) which probably has the formula $(C_5H_8)_x \cdot SnCl_4$. The tin and chlorine split off upon drowning the reaction product, leaving the cyclized rubber hydrocarbon. In this procedure aluminum chloride, ferric chloride, chromic chloride or another halide of an amphoteric metal, may replace the tin chloride.

Condensation derivatives containing a small amount of combined chlorine are obtained when a rubber cement is treated with chlorostannic acid or a mixture of hydrochloric acid and a compound such as tin tetrachloride. It is not necessary to preboil the cement before treatment if the rubber conversion agent employed is of this sort. In this type of reaction, rubber, milled to a plasticity of about 300, is dissolved in sufficient benzene to form a 10% solution, and to the resultant 10% (based on the weight of the rubber) of crystalline chlorostannic acid is added. The reaction mixture is then heated to boiling under a reflux condenser maintained at or near the boiling point until the desired reaction has taken place. To isolate the cyclized rubber the reaction mixture is filtered and poured with agitation into sufficient water to form an emulsion in which the solution of the reaction product forms the discontinuous phase. It is advantageous to add a reducing agent such as sodium sulfite to the water to prevent or minimize the oxidation. The emulsion is steam distilled to remove the benzene, with the result that the condensation derivative precipitates as a fine powder.

For some uses, such as the cementing agent in a lacquer, it is advantageous to mill the powder to a homogeneous mass before compounding it with the other ingredients.

The deformation point (point at which plastic flow is detectable) of the condensation derivative depends (apparently) upon the extent to which the rubber has been converted to cyclized rubber, that is, the extent to which the conversion agent acts on the rubber. This, in turn, is dependent upon the time and temperature of the treatment. The reaction at the beginning is highly exothermic, and the practical lower limit of conversion is about 25% (the conversion being stopped by drowning the reaction mass promptly). This degree of conversion brings about a deformation point (sometimes called "softening point") of about 30° C. When a conversion of practically 100% has taken place, the deformation point is about 105° C. As will be apparent, the higher the degree of conversion, the higher will be the deformation point. Products having the lower deformation points are usually obtainable commercially in the non-homogeneous form which results from drowning the reaction mixture and in the uniform condition obtained by milling the non-uniform product. The milled products are generally the more stable of the two and are more uniformly soluble. The distinction between the two types of materials progressively disappears as the degree of conversion approaches completeness.

Condensation derivatives with a softening point from 50° to 140° C. are, in general, satisfactory for use in adhesives, lacquers, and the like. A product with a softening point around 70° C. is ordinarily employed. Obviously, the most satisfactory softening point for any particular use depends upon the nature of the use.

By the expression "anchor" or equivalents (anchoring, anchored, etc.) is meant the securing of the surface coating on the base in such a way that the resulting product will withstand the deleterious effects of water (or moisture). Whether a substance is an anchoring agent or not is easily determined, for example, by comparing the time of immersion in water required to loosen a moistureproofing coating containing the substance, with the time required to bring about the same loosening with the coating omitting the substance being tested (but otherwise having the same proportions of ingredients). Compositions of this invention will adhere to the base sheet for one day as compared with one hour for the same compositions employing heretofore known cementing agents, when tested by immersion in water at 20° C. This is a 24-fold improvement in the time required to loosen the coating from the water sensitive and non-moistureproof base sheet when it is in direct contact with water.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

Heat seal bond and heat seal bond strength are defined, and a standard test for their determination is given, in U. S. A. Patent No. 2,147,180 (Ubben). In the interest of brevity the definitions and test description are not repeated here. The terms and expressions related thereto and employed herein are used in accordance with such definitions and description.

The moisture resistant coating compositions of this invention adhere more firmly to the base sheets to which they are applied than heretofore proposed compositions. In particular they adhere very tenaciously for long periods of time when subjected to high humidity, moisture, water, etc. The moistureproof materials give exceptionally good protection. Adhesive bonds formed by the application of heat and pressure are particularly strong and durable, and maintain their effectiveness for long periods of time. In general the cyclized rubber is stabilized by the incorporation of the polybutenes to such an extent that the desirable properties of coatings, adhesive layers, etc., made therefrom are not altered over long periods of time. Especially is this true when they are exposed to light, ultraviolet light and heat.

It is surprising that these desirable results should be so outstanding, because it is well known that heavy hydrocarbon oils do not produce such a result, that is to say, the results of this invention are not obtained if heavy hydrocarbon oils and other materials of a similar nature are substituted for the long chain saturated hydrocarbon polybutene material in the various compositions.

It has not been possible to obtain the results of this invention with other stabilizing materials heretofore known in the art and used for the purpose of stabilizing coating compositions comprising phenol rubber products.

As many apparently widely different embodiments of this invention may be made without departing from the spirit and scope thereof, it is to be understood that this invention is not limited to the specific embodiments thereof except as defined in the appended claim.

I claim:

Sheet wrapping material comprising regenerated cellulosic sheet having a coating comprising essentially:

| | Parts |
|---|---|
| Cyclized rubber | 24 |
| Paraffin wax (M. P. 60° C.) | 3 |
| Polybutene (M. W. 1,000) | 3 |

JAMES A. MITCHELL.